United States Patent Office 3,394,799
Patented July 30, 1968

3,394,799
ADHESIVE TAPE CARRYING
RELEASE COATING
Daniel Dickerson Ritson, Riverside, and Walter Florus Reynolds, Stamford, Conn., assignors to American Cyanamid Company, Stamford, Conn., a corporation of Maine
Filed Sept. 8, 1964, Ser. No. 394,882
12 Claims. (Cl. 206—59)

ABSTRACT OF THE DISCLOSURE

The invention is based on the discovery that the hydrophobic higher polyacyl polyalkylenepolyamines which are substantially free from polybasic mineral acid and which contain an average of at least one basic amino linkage per molecule are release agents for pressure-sensitive adhesives. The invention includes sheet material coated with the composition on either or both sides.

---

Figure 1:
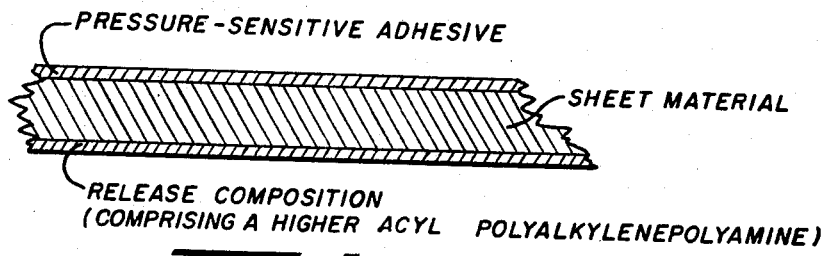

The present invention relates to sheet material carrying on one side a pressure-sensitive adhesive and on the other side a release composition therefor, present alone or with added binder. The invention includes an assembly of sheet material which carries pressure-sensitive adhesive on both sides and sheet material which carries a release composition on both sides. The invention thus covers a roll composed of tape coated on both sides with pressure-sensitive adhesive interleaved with tape coated with release agent on both sides.

A release composition for pressure-sensitive tape is a material which, when present as a coating on a given surface, decreases the pull required to peel tape carrying a pressure-sensitive adhesive from that surface without undue harm to the reseal properties (i.e. adhesiveness) of the adhesive.

Sheet material carrying pressure-sensitive adhesive is commonly sold either in the form of flat assemblies composed of rectangles of the sheet material stacked one above the other, or in the form of rolls. The aggressive properties of the adhesive require that the adhesive-coated surfaces be stored in contact with a surface having a low affinity for the adhesive, i.e., with a surface carrying a release composition of the properties described above. The release composition covers only the back of "single coated" sheet material (i.e., sheet material which is coated on only one side) and permits the sheet material to be wound into the form of a roll, and then to be unwound. When the sheet material is double coated, i.e., when it is coated with adhesive on both its sides, release is effected by use of interleaving sheets coated on both sides with a release composition for the adhesive used. The sheet material referred to above includes regenerated cellulose, paper, latex-impregnated paper, polyethylene, polypropylene, cellulose acetate, nylon, terephthalate esters, vinyl polymers, and sheet aluminum. The sheet material may be of the thickness of films or of greater thickness to permit the material to be used for wall coverings etc.

Webber U.S. Patent No. 2,822,290 (1958) discloses that sheet material which carries a coating of the partial organic amides of certain strong polybasic inorganic acids (preferably sulfuric and phosphoric acids) possesses good release properties. These amides, however, contain free acid groups. Acid is generally an undesirable component of industrial sheet material, particularly when the substrate is cellulose or other material which undergoes acid tendering on aging or when the backing may come into contact with acid-sensitive surfaces.

The discovery has now been made that sheet material possesses satisfactory release properties when it carries a hydrophobic higher acyl polyalkylenepolyamine which is substantially free from polybasic mineral acid and which contains at least one basic amino linkage per molecule. These linkages may be unneutralized, so that the sheet material may be free from mineral or other acid.

The invention is illustrated by the drawing wherein:
FIG. 1 is a schematic vertical section of sheet material which carries on one side a coating of a pressure-sensitive adhesive and on the other side a release agent (a higher alkoyl polyalkylenepolyamine more particularly described below).

Figure 2:
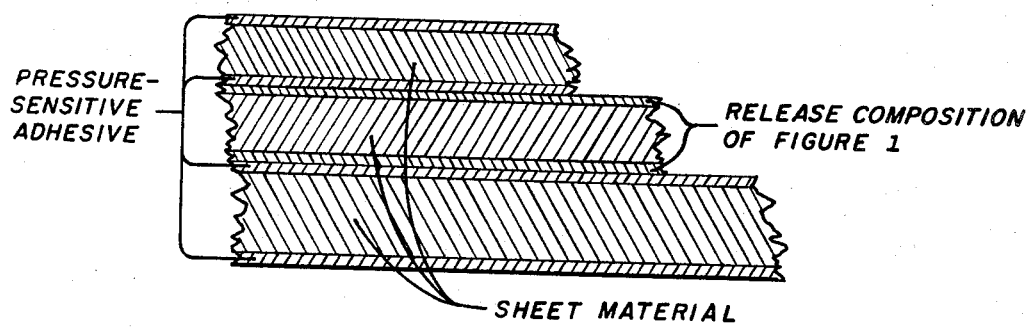

FIG. 2 is a schematic vertical section of an assembly composed of two sheets of sheet material each of which carries pressure-sensitive adhesive on both its sides, interleaved with a sheet of material which carries on both its sides the release agent present on the sheet material of FIG. 1.

The pressure-sensitive adhesives which are present on sheet material of the present invention may be any of the materials which have been customarily used as such. In general, they are tacky vinyl copolymers or tacky blends of natural rubber with such copolymers; for details see the Webber patent referred to above, and Dabroski U.S. Patent No. 3,067,057 (1962).

The release agents present on the sheet material of the present invention are derivatives of the polyalkylenepolyamines, which are a widely-used group which includes compounds of the formula $H_2N(C_nH_{2n}NH)_xH$, in which $n$ and $x$ are integers greater than 1 and which are preferably 2 to 4 inclusive. Typical amines of this class are diethylenetriamine, triethylenetetramine, and tetraethylenepentamine. The corresponding polypropylenepolyamines and polybutylenepolyamines are substantial equivalents. All these polybutylenepolyamines are water-soluble and basic and are characterized by the property of condensing at elevated temperatures with higher fatty acids to yield partially acylated polyalkylenepolyamines (for example dipalmitoyl tetraethylenepentamine) and if desired on further heating their imidazoline derivatives. In addition, the suitable polyalkylenepolyamines include the higher molecular weight polyalkylenepolyamines formed by homopolymerizing the lower alkylenimines (for example polyethylenimine) and the long chain polyamines formed by reaction of methylenebisacrylamide with ethylenediamine or other similar polyamine.

Release agents suitable for use in the present invention are prepared by reacting one or more of the above-described polyalkylenepolyamines with a higher hydrophobic fatty acid (or fatty acid chloride) in such amount as to form a hydrophobic (i.e. water-insoluble) condensation product. The precise amount of the fatty acid or fatty acid chloride needed in any one instance varies with the molecular weight (chain length) of the fatty acid and the water-solubility and molecular weight of the polyalkylenepolyamine, and is most easily found by laboratory trial, but the molar ratios should be such that the product contains —NH— linkages equivalent to at least about one —NH— linkage per molecule. Suitable examples are disclosed in Reynolds et al. U.S. Patent No. 2,772,969 (1956). The reaction is performed by heating the components at an amidification temperature (e.g. 170°–200° C.) until at least half the fatty acid has amidated; the heating is advantageously continued until substantially all the fatty acid has amidated. If desired the temperature may then be increased to permit imidazoline formation to take place.

Suitable fatty acids include lauric, palmitic and stearic acids. Any fatty acid between $C_8$ and $C_{20}$ is suitable, best results generally being obtained from acids in the $C_{16}$–$C_{20}$ range.

The reaction products are acylamines and are therefore basic. They may be applied to the surfaces to be treated as solutions in organic solvent. The preferred solvent is one which neither dissolves nor swells rubber or rubbery adhesive copolymers, and for this purpose hot ethanol is preferred.

It will generally be found more convenient to apply the reaction products in aqueous medium. For this purpose the reaction products are rendered water-dispersible by addition of a suitable amount for the purpose of a water-soluble monobasic acid or an agent which forms a water-soluble monobasic acid by reaction with amines. Suitable acids and acid-forming materials include acetic acid, hydrochloric acid and epichlorohydrin.

The acids and acidic materials are generally best added to the reaction products while they are in anhydrous molten state; the precise amounts of these materials to be added varies from instance to instance, but is easily found by laboratory trial.

Preferred embodiments of sheet material according to the present invention carry the release agent as a component of a film material which adheres directly to the sheet material and which prevents removal of the release agent from the sheet substrate when the adhesive tape is peeled therefrom. As a result of this binding action, the pressure-sensitive adhesive (when peeled from the release surface) possesses better adhesiveness or "re-seal" value than would otherwise be the case.

Not all film material is suited to act as binder for the release agent, and we have found polyvinyl acetate, polyvinyl alcohol and cationic starch to be comparatively ineffective for this purpose. On the other hand, hydrophobic vinyl polymers comprising a major amount of ethyl acrylate have generally been found very effective, as well as polyethylene oxide (a water-soluble polymer). We have further found that mopolymers of a major amount of ethyl acrylate with a minor amount of a vinyl compound copolymerizable therewith are particularly advantageous as binders because they have a compatibility for amine-aldehyde condensation products, which act as supplementary binders and as anti-blocking agents. This latter discovery permits interleaving paper or other sheet material to be treated with the release composition on both sides and to be rolled, stored, and unwound with lessend tendency to tear. Accordingly, we find it most advantageous to form the sheet material of the present invention by applying to a suitable substrate a composition essentially composed of an aqueous medium having a uniformly distributed content of one of the dispersible acyl polyalkylenepolyamines described above as primary release agent, a water-insoluble copolymer predominantly composed of ethyl acrylate as binder, and a water-soluble amine-aldehyde resin as supplementary binder and anti-blocking agent.

The invention will be illustrated by the examples which follow. These examples are specific embodiments of the invention, and are not to be construed as limitations thereon.

*Example 1*

The following illustrates the release properties of sheet material carrying tristearoyl tetraethylene-pentamine as release agent, applied from organic solution.

A 5% by weight solution of tristearoyl tetraethylenepentamine in hot 2–B ethanol is coated at approximately 0.6 lb./1000 ft.² (solids basis) upon a sample of commercial saturated backing tape (30 lb. crepe kraft paper which had been saturated with a synthetic rubber latex and dried). The tape after being coated with the ethanol solution is dried by being placed in an oven at 375° F. for 1 minute. The resulting tape carries no acid, and the coating is definitely alkaline. A control tape is prepared in the same manner except that the tristearoyl tetraethylenepentamine is omitted from the hot ethanol.

Half of a 6" length of cellulose tape carrying a pressure-sensitive adhesive (masking tape) is pressed by means of a weighted rubber roll upon each of the tapes treated as described above, and the pull necessary to peel the tapes apart is determined by hand. The masking tape is more easily peeled from the tape carrying the tristearoyl tetraethylene pentamine than from the control (untreated) type.

Similar release results are obtained when the solution of the tristearoylpentamine is applied to glass, aluminum, cellulose acetate, regenerated cellulose, polyethylene, and a laminate having a thermoset melamine resin surface as substrates, and the solution is dried at 375° F.

*Example 2*

The following illustrates the release properties of sheet material carrying tristearoyl tetraethylenepentamine as release agent, applied from dispersion in aqueous medium.

The procedure of Example 1 is repeated except that the tristearoyl tetraethylenepentamine is applied as a 5% by weight aqueous dispersion (prepared by melting 1 mol of the tristearoyl tetraethylenepentamine at 115° C., stirring in 1 mol of glacial acetic acid as solubilizing agent, stirring 5 g. of the product with vigorous agitation into 95 g. of boiling water, and cooling.

Results are substantially the same as those of Example 1.

*Example 3*

The following illustrates the properties of sheet material according to the present invention, showing the comparative effect of the release agent when present alone and when it is carried in a coating of organic film-forming material. The release compositions employed are as follows:

(A) Hydrophobic higher polyacyl polyalkylenepolyamine release agent. Prepared by reacting 2.5 mol of a commercial mixture of higher fatty acids composed of 77% stearic acid and 20% palmitic acid with triethylenetetramine at 200° C. for two hours under nitrogen, cooling the reaction product to 110° C., stirring 1 mol of glacial acetic acid (sufficient to neutralize about ⅔ of the basic amino groups present), dispersing the resulting salt in hot water, rapidly cooling the resulting dispersion, and diluting to 5% solids by weight. This composition does not contain a binder.

(B) Composition A, in which is dissolved as binder a weight of poly(ethoxy)ethanol (molecular weight 4,000), commercially known as Carbowax 4,000.

(C) Composition A, in which is dissolved as binder a thermosetting acetone-formaldehyde resin (commercially known as Ketac 1156).

(D) Composition A, in which is dispersed as binder an emulsion of ethyl acrylate-methyl methacrylate copolymer. The emulsion is prepared by emulsion copolymerization of the monomers in 70:70 molar ratio in aqueous medium containing an ethylene oxide-nonyl phenol adduct as emulsifying agent and a redox catalyst.

(E) Composition A, in which is dispersed as binder an aqueous emulsion of a substantially linear non-aromatic hydrocarbon resin having a molecular weight of about 1,400 (commercially known as Piccopale N3).

(F) The preparation of Composition A is repeated, except that the amount of glacial acetic acid is decreased to 0.2 mol and the dispersion is neutralized with ammonium hydroxide. There is then added as binder an emulsion of an ethyl acrylate:styrene copolymer (molar ratio 1:1). The emulsion is prepared by emulsion copolymerization of monomers in aqueous medium containing a redox catalyst and an anionic emulsifying agent.

(G) Composition F, having a dissolved content of di(methoxymethyl)melamine as supplementary binder and as anti-blocking agent equal in weight to the weight of the copolymer solids.

(H) Composition A, wherein the amount of glacial acetic acid added is 0.2 mol.

The ratios of the weight of the release agent to the weights of the respective binders are shown in the table.

The above-described release compositions are applied to backing tape of the type described in Example 1 at 5% total solids by weight in amount to provide 0.35 lb. of solids per 1,000 ft.$^2$ of tape surface. The wet tapes are oven-dried for 1 minute at 375° F.

The release properties of the thus coated tapes are determined by the method of Example 1, except that the amount of pull required to peel the adhesive tape from the release coated surface is determined by means of a laboratory Suter tensile strength tester.

The values obtained are as follows:

| Release Composition [1] | | Binder | Ratio Release Agt. to Binder [2] | Pull to Lb./in.$^2$ Backing | Peel from Steel (Reseal) |
|---|---|---|---|---|---|
| Run No.: | | | | | |
|  | None | None |  | 16.8 | 15.5 |
| 1 | A | do | 1:0 | 9.9 | 17.4 |
| 2 | B | Polyethylene oxide | 1:1 | 10.6 | 20.3 |
| 3 | C | Acetone-CH$_2$O resin | 1:1 | 11.4 | 16.7 |
| 4 | D | Ethylacrylate-methyl methacrylate copol (non-ionic emulsifier). | 1:3 | 8.9 | 20.2 |
| 5 | E | Hydrocarbon wax | 1:1 | 11.4 | 19.6 |
| 6 | F | Ethylacrylate-styrene copolymer | 1:4 | 9.3 | 14.6 |
| 7 | G | Ethylacrylate-styrene copolymer+ melamine-CH$_2$O resin. | 1:2:2 | 9.0 | 13.6 |
| 8 | H | None |  | 10.2 | 17.9 |

[1] For details see text above.
[2] Ratio by weight; weight of binder includes all binder solids.

Example 4

The procedure of Example 1 is repeated except that the acyl polyalkylenepolyamine used as the release agent is the reaction product of 1.6 mol of palmitic acid with diethylenetriamine. Results are substantially the same.

Example 5

The procedure of Example 1 is repeated except that the acyl polyalkylenepolyamine used as the release agent is the reaction product of 2.4 mols of lauric acid with triethylenetriamine. Results are substantially the same.

We claim:
1. Sheet material carrying on one side a pressure-sensitive adhesive and on the other side as release agent for said adhesive a hydrophobic higher polyacyl polyalkylenepolyamine wherein the acyl substituents are higher fatty acid residues; said polyalkylenepolyamine being substantially free from polybasic mineral acid and containing an average of at least one basic amino linkage per molecule.

2. Sheet material according to claim 1 wherein the basic amino linkages are unneutralized.

3. Sheet material according to claim 1 wherein the basic amino linkages are neutralized with a monobasic acid.

4. Sheet material according to claim 1, wherein the polyalkylenepolyamine is carried in a film of a material selected from the group consisting of (a) hydrophobic vinyl polymers comprising a major amount of ethyl acrylate; (b) polyethylene oxide; (c) acetoneformaldehyde resin; and (d) hydrocarbon wax, adherent to said sheet material.

5. Sheet material according to claim 4 wherein the film is homopolymerized ethylene oxide.

6. Sheet material according to claim 4 wherein the film is a hydrocarbon wax.

7. Sheet material according to claim 4 wherein the film is a 70:30 molar ratio ethyl acrylate:methyl methacrylate copolymer.

8. Sheet material according to claim 4 wherein the film is a thermoplastic substantially linear hydrocarbon resin having a molecular weight of about 1,400.

9. Sheet material according to claim 4 wherein the film is a 50:50 molar ratio ethyl acrylate:styrene copolymer.

10. Sheet material carrying on one side a pressure-sensitive adhesive and on the other side as release agent for said adhesive, a hydrophobic stearoyl polyalkylenepolyamine substantially free from polybasic mineral acid and containing an average of at least one basic amino linkage per molecule.

11. Sheet material carrying on one side a pressure-sensitive adhesive and on the other side tristearoyl tetraethylenepentamine as release agent for said adhesive.

12. A roll of sheet material carrying on both sides a pressure-sensitive adhesive and a roll of sheet material carrying on both sides a hydrophobic higher acyl polyalkylenepolyamine wherein the acyl substituents are higher fatty acid residues; said polyalkylenepolyamine containing an average of at least one basic amino linkage per molecule as release agent for said adhesive, said latter sheet material being interleaved with said former sheet material.

References Cited

UNITED STATES PATENTS

| 2,201,041 | 5/1940 | Katz | 134—18 |
| 2,345,632 | 4/1944 | Robinson et al. | 260—404.5 |
| 2,727,836 | 12/1955 | Brillhart | 117—144 |
| 2,772,969 | 12/1956 | Reynolds et al. | 92—21 |
| 2,822,290 | 2/1958 | Webber | 117—68.5 |
| 2,923,646 | 2/1960 | Jordan | 117—155 |
| 3,092,250 | 6/1963 | Knutson et al. | 206—59 |
| 3,240,330 | 3/1966 | Christmas | 206—59 |

WILLIAM D. MARTIN, *Primary Examiner.*

W. D. HERRICK, *Assistant Examiner.*

UNITED STATES PATENT OFFICE
CERTIFICATE OF CORRECTION

Patent No. 3,394,799                                      July 30, 1968

Daniel Dickerson Ritson et al.

It is certified that error appears in the above identified patent and that said Letters Patent are hereby corrected as shown below:

Column 2, line 36, "polybutylenepolyamines" should read -- polyalkylenepolyamines --. Column 4, line 57, "70:70" should read -- 70:30 --.

Signed and sealed this 13th day of January 1970.

(SEAL)
Attest:

Edward M. Fletcher, Jr.                         WILLIAM E. SCHUYLER, JR.
Attesting Officer                                         Commissioner of Patents